(12) United States Patent
Yamamoto et al.

(10) Patent No.: US 12,739,318 B2
(45) Date of Patent: Sep. 15, 2026

(54) RESIN COMPOSITION AND DISPLAY DEVICE INCLUDING ADHESIVE MEMBER FORMED FROM THE RESIN COMPOSITION

(71) Applicant: Samsung Display Co., Ltd., Yongin-Si (KR)

(72) Inventors: Katsuhiro Yamamoto, Yokohama (JP); Shintaro Nagayama, Yokohama (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 962 days.

(21) Appl. No.: 17/872,309

(22) Filed: Jul. 25, 2022

(65) Prior Publication Data

US 2023/0164252 A1 May 25, 2023

(30) Foreign Application Priority Data

Nov. 25, 2021 (KR) ........................ 10-2021-0164929

(51) Int. Cl.
*H04M 1/02* (2006.01)
*C09J 133/08* (2006.01)

(52) U.S. Cl.
CPC ......... *H04M 1/0268* (2013.01); *C09J 133/08* (2013.01); *C09K 2323/057* (2020.08)

(58) Field of Classification Search
CPC .............. C09K 2323/057; C09J 133/08; C09J 2203/318; C09J 4/06; H04M 1/0268; C08F 222/1065; C08F 220/343; C08F 290/147; C08F 220/1808; C08F 222/102; C08F 220/20; C08F 230/085
See application file for complete search history.

(56) References Cited

U.S. PATENT DOCUMENTS

2013/0088542 A1 4/2013 Hisanaga
2021/0171691 A1 6/2021 Shinohara et al.
2021/0276309 A1 9/2021 Shimizu et al.

FOREIGN PATENT DOCUMENTS

JP 2012-237965 12/2012
JP 2013-091774 5/2013
JP 2016-121305 7/2016
JP 2017-210578 11/2017
JP 6531531 6/2019

(Continued)

OTHER PUBLICATIONS

Examination report dated Jun. 24, 2026 from the Korean Patent Office in corresponding Korean Patent Application No. KR 10-2021-0164929.

*Primary Examiner* — Sophie Hon
(74) *Attorney, Agent, or Firm* — F. CHAU & ASSOCIATES, LLC

(57) ABSTRACT

A resin composition includes at least one (meth)acrylate monomer, a plurality of bifunctional urethane (meth)acrylates, and at least one photoinitiator. The plurality of bifunctional urethane (meth)acrylates includes a first bifunctional urethane (meth)acrylate having a first weight average molecular weight, and a second bifunctional urethane (meth) acrylate having a second weight average molecular weight that is higher than the first weight average molecular weight. A first weight of the first bifunctional urethane (meth) acrylate is greater than or equal to a second weight of the second bifunctional urethane (meth)acrylate with respect to a total weight of the resin composition.

11 Claims, 8 Drawing Sheets

(56) References Cited

FOREIGN PATENT DOCUMENTS

| | | | | |
|---|---|---|---|---|
| KR | 10-2016-0049168 A | 5/2016 | | |
| KR | 10-2209549 | 2/2021 | | |
| KR | 102209549 B1 * | 2/2021 | .............. | C09D 7/47 |
| KR | 10-2021-0068854 | 6/2021 | | |
| KR | 10-2021-0076600 | 6/2021 | | |
| WO | 2020-045663 | 3/2020 | | |
| WO | 2020-050366 | 3/2020 | | |

* cited by examiner

RESIN COMPOSITION AND DISPLAY DEVICE INCLUDING ADHESIVE MEMBER FORMED FROM THE RESIN COMPOSITION

CROSS-REFERENCE TO RELATED APPLICATION

This application claims priority under 35 U.S.C. § 119 to Korean Patent Application No. 10-2021-0164929, filed on Nov. 25, 2021 in the Korean Intellectual Property Office, the disclosure of which is incorporated by reference in its entirety herein.

1. TECHNICAL FIELD

The present disclosure herein relates to a resin composition and a display device including an adhesive member formed from the resin composition.

2. DISCUSSION OF RELATED ART

Various multimedia devices include a display device, such as a television, a mobile phone, a tablet computer, a navigation system, and a game console. Various display devices are being developed. In particular, recently, display devices which are foldable, bendable, or rollable that include flexible display members are under development to provide increased portability and user convenience.

Each member used in a flexible display device should have reliability in a folding or bending operation. In addition, an adhesive resin used to form an adhesive layer applied to display devices in various forms should have reliability for members of the display devices in various forms.

SUMMARY

Embodiments of the present disclosure provide a resin composition for forming an adhesive member which may be provided by an inkjet printing method and has excellent adhesive reliability and folding reliability.

Embodiments of the present disclosure also provide a display device including the adhesive member formed from the resin composition, thereby having an increased reliability.

According to an embodiment of the present disclosure, a resin composition includes at least one (meth)acrylate monomer, a plurality of bifunctional urethane (meth)acrylates, and at least one photoinitiator. The plurality of bifunctional urethane (meth)acrylates includes a first bifunctional urethane (meth)acrylate having a first weight average molecular weight, and a second bifunctional urethane (meth) acrylate having a second weight average molecular weight that is higher than the first weight average molecular weight. A first weight of the first bifunctional urethane (meth) acrylate is greater than or equal to a second weight of the second bifunctional urethane (meth)acrylate with respect to a total weight of the resin composition.

In an embodiment, the first weight average molecular weight may be greater than or equal to about 10,000 and less than about 20,000, and the second weight average molecular weight may be greater than or equal to about 20,000 and less than about 40,000.

In an embodiment, a sum of the first weight and the second weight may be greater than or equal to about 11 wt % and less than about 15 wt % with respect to the total weight of the resin composition.

In an embodiment, the first weight may be greater than or equal to about 5 wt % and less than about 12 wt %, and the second weight may be greater than or equal to about 3 wt % and less than about 6 wt %.

In an embodiment, the resin composition may have a viscosity in a range of about 8 mPa·s to about 50 mPa·s at about 25° C. as measured according to JIS Z8803 method.

In an embodiment, after the resin composition is UV-cured, the resin composition has a 180 degree peel strength with respect to a polymer substrate of about 800 gf/25 mm or more.

In an embodiment, the resin composition after UV-cured may have a storage modulus greater than about 0.01 MPa and less than or equal to about 0.1 MPa at about 25° C. as measured according to JIS K7244-7 method.

In an embodiment, the plurality of bifunctional urethane (meth)acrylates may include a polyether-based urethane (meth)acrylate.

In an embodiment, the (meth)acrylate monomer may be provided in plurality, and a sum of the weights of the plurality of (meth)acrylate monomers may be in a range of about 83 wt % to about 90 wt % with respect to the total weight of the resin composition.

According to an embodiment of the present disclosure, a display device includes a display panel. A window is disposed on the display panel. An adhesive member is disposed between the display panel and the window. The adhesive member contains a polymer derived from a resin composition including at least one (meth)acrylate monomer, a plurality of bifunctional urethane (meth)acrylates, and at least one photoinitiator. The plurality of bifunctional urethane (meth)acrylates include a first bifunctional urethane (meth) acrylate having a first weight average molecular weight and a second bifunctional urethane (meth)acrylate having a second weight average molecular weight that is higher than the first weight average molecular weight. A first weight of the first bifunctional urethane (meth)acrylate is greater than or equal to a second weight of the second bifunctional urethane (meth)acrylate with respect to a total weight of the resin composition.

In an embodiment, the first weight average molecular weight may be greater than or equal to about 10,000 and less than about 20,000, and the second weight average molecular weight may be greater than or equal to about 20,000 and less than about 40,000.

In an embodiment, a sum of the first weight and the second weight may be greater than or equal to about 11 wt % and less than about 15 wt % with respect to the total weight of the resin composition.

In an embodiment, the first weight may be greater than or equal to about 5 wt % and less than about 12 wt %, and the second weight may be greater than or equal to about 3 wt % and less than about 6 wt %.

In an embodiment, the adhesive member may have a 180 degree peel strength with respect to a polymer substrate that is greater than or equal to about 800 gf/25 mm.

In an embodiment, the adhesive member may have a storage modulus greater than about 0.01 MPa and less than or equal to about 0.1 MPa at about 25° C. as measured according to JIS K7244-7 method.

In an embodiment, the display device may further include a lower module disposed under the display panel and including a support plate and a lower adhesive layer disposed on at least one of an upper portion or a lower portion of the support plate, wherein the lower adhesive layer may include the polymer derived from the resin composition.

In an embodiment, at least one opening extending through a top surface and a bottom surface of the lower adhesive layer may be defined in the lower adhesive layer.

In an embodiment, the adhesive member may be formed by providing the resin composition on one surface of the window or one surface of the display panel by an inkjet printing method or a dispensing method and by photo-curing the resin composition provided on the one surface of the window or the one surface of the display panel.

In an embodiment, the display device may further include a light control layer disposed between the adhesive member and the window and an optical adhesive layer disposed between the light control layer and the window, and the optical adhesive layer may include the polymer derived from the resin composition.

In an embodiment, the display device may include at least one folding region, and the folding region may have a radius of curvature that is less than or equal to about 5 mm.

BRIEF DESCRIPTION OF THE DRAWINGS

The accompanying drawings are included to provide a further understanding of the present disclosure, and are incorporated in and constitute a part of this specification. The drawings illustrate non-limiting embodiments of the present disclosure and, together with the description, serve to explain principles of the present disclosure. In the drawings.

DETAILED DESCRIPTION OF EMBODIMENTS

Figure 1A:
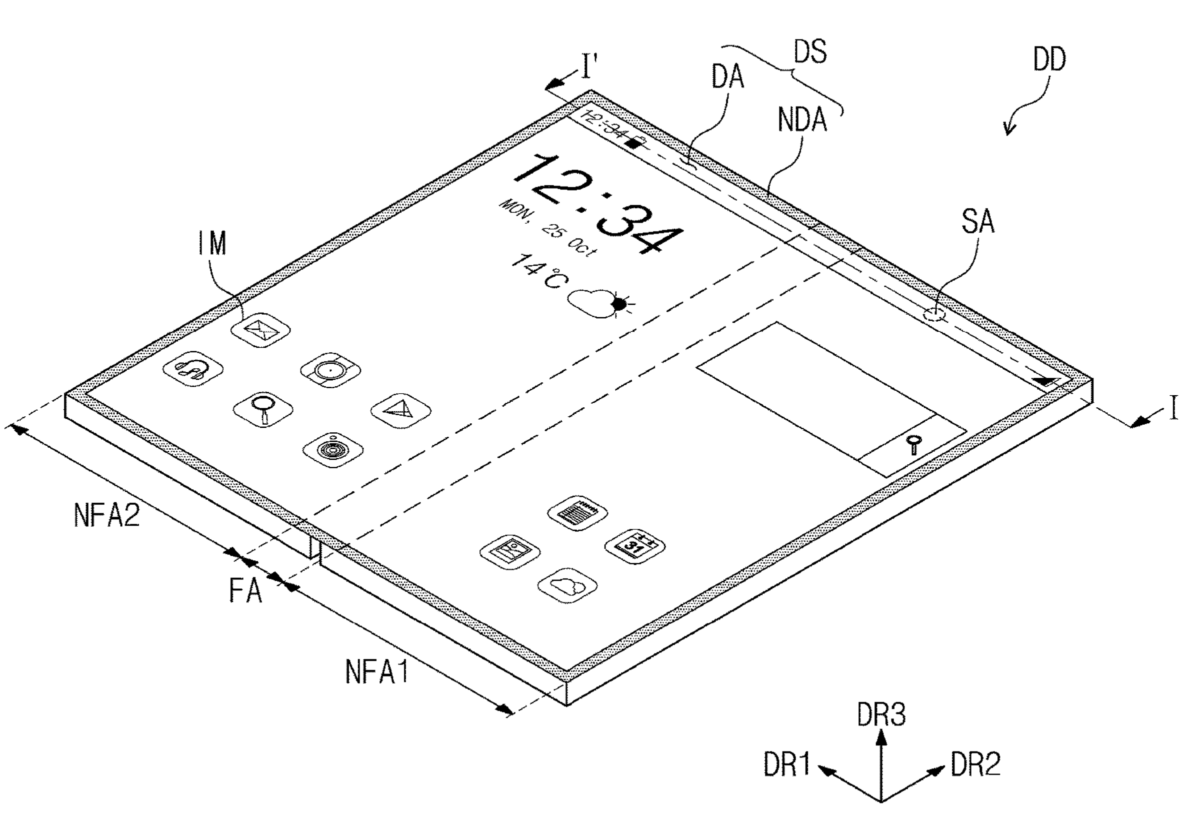
FIG. 1A is a perspective view illustrating a display device according to an embodiment of the present disclosure.

The present disclosure may be modified in many alternate forms, and thus specific, non-limiting embodiments will be illustrated in the drawings and described in detail. It should be understood, however, that these embodiments are not intended to limit the present disclosure to the particular forms disclosed, but rather, is intended to cover all modifications, equivalents, and alternatives falling within the spirit and scope of the present disclosure.

In the present specification, when a component (or a region, a layer, a portion, etc.) is referred to as being "on," "connected to," or "coupled to" another component, it means that the component may be directly disposed on/connected to/coupled to the other component, or that a third component may be disposed therebetween. When a component (or a region, a layer, a portion, etc.) is referred to as being "directly on," "directly connected to," or "directly coupled to" another component, it means that a third component is not disposed therebetween.

Like reference numerals refer to like elements throughout. Also, in the drawings, the thicknesses, ratios, and dimensions of the components may be exaggerated for effective description of technical contents. The term "and/or" includes all combinations of one or more of which associated configurations may define.

It will be understood that, although the terms "first," "second," etc. may be used herein to describe various components, these components should not be limited by these terms. These terms are only used to distinguish one component from another. For example, a first component could be termed a second component, and, similarly, a second component could be termed a first component, without departing from the scope of the present disclosure. The terms of a singular form may include plural forms unless the context clearly indicates otherwise.

In addition, terms such as "below," "under," "on," and "above" may be used to describe the relationship between components illustrated in the figures. The terms are used as a relative concept and are described with reference to the direction indicated in the drawings.

It should be understood that the terms "comprise," or "have" are intended to specify the presence of stated features, integers, steps, operations, components, parts, or combinations thereof in the disclosure, but do not preclude the presence or addition of one or more other features, integers, steps, operations, components, parts, or combinations thereof.

Unless otherwise defined, all terms (including technical and scientific terms) used herein have the same meaning as commonly understood by one of ordinary skill in the art to which the present disclosure belongs. In addition, it will be understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
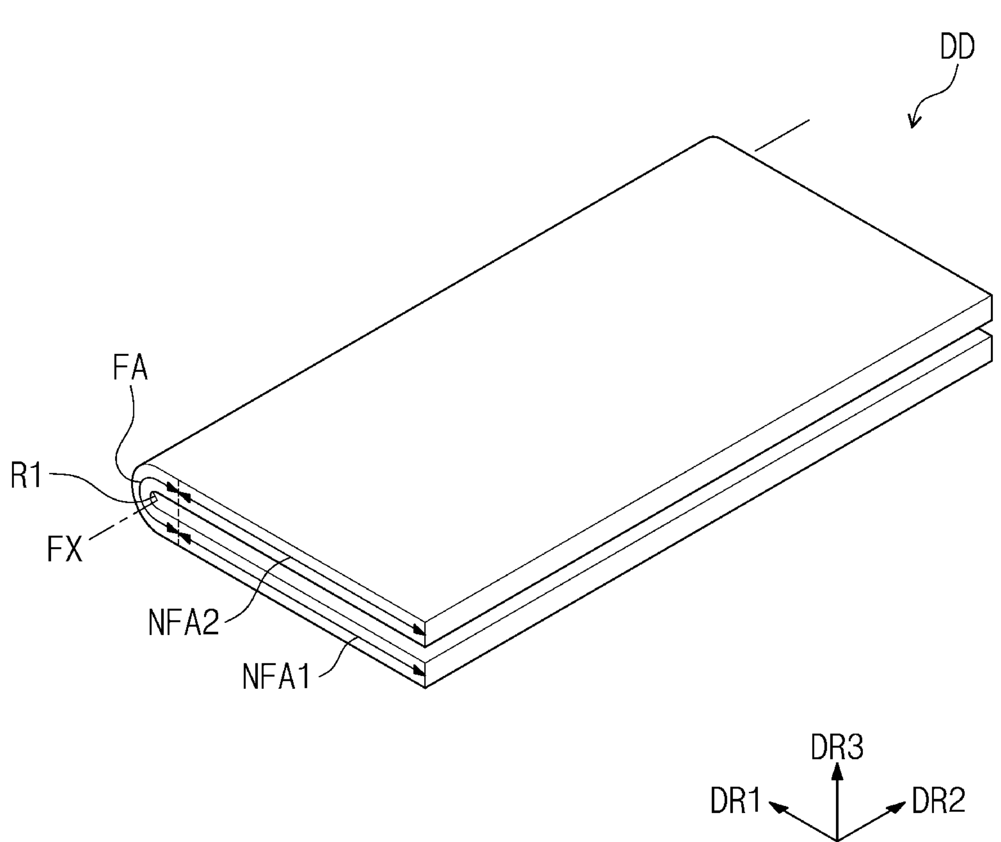
FIG. 1B is a perspective view illustrating a folded state of the display device illustrated in FIG. 1A according to an embodiment of the present disclosure.

Hereinafter, a display device and resin composition according to an embodiment of the present disclosure will be described with reference to the drawings. FIG. 1A is a perspective view of a display device according to an embodiment. FIG. 1B is a perspective view illustrating a folded state of the display device illustrated in FIG. 1A.

The display device DD according to an embodiment may be a flexible display device which may be folded or bent from an unfolded state or may be maintained in a folded state or bent state. In the specification, the term "flexible" means bendable characteristics, and is not limited to a structure that is bent and fully folded, but may include a structure that is bent up to a level of several nanometers (nm).

Referring to FIGS. 1A and 11B, a display device DD may be a device that is activated according to an electrical signal. For example, in an embodiment, the display device DD may be a portable electronic device, a personal digital terminal, a tablet, a car navigation unit, a game console, or a wearable device. However, embodiments of the present disclosure are not necessarily limited thereto. FIGS. 1A and 1B illustrate that the display device DD is a portable electronic device for convenience of explanation.

Referring to FIG. 1A, the display device DD according to an embodiment may include a display surface OS defined by a first directional axis DR1 and a second directional axis DR2 crossing the first directional axis DR1. The display device DD may provide an image IM for a user through the display surface DS. For example, in an embodiment of FIG. 1A, the image IM is software application icons and a clock, temperature and calendar window. However, embodiments of the present disclosure are not necessarily limited thereto and the image IM may be various different subject matter.

The display surface DS may include a display region DA and a non-display region NDA adjacent to the display region DA. The display region DA may display the image IM and the non-display region NDA may not display the image IM. The non-display region NDA may surround the display region DA (e.g., in the first and/or second directions DR1, DR2). However, embodiments of the present disclosure are not necessarily limited thereto, and the shape of the display region DA and the shape of the non-display region NDA may vary.

The display surface DS may further include a sensing region SA. The sensing region SA may be a portion of the display region DA. The sensing region SA may have a light transmittance higher than that of the display region DA. A light signal, for example, visible light or infrared light may move through the sensing region SA. The display device DD may include an electronic module CM (FIG. 2) that takes an external image through the visible light passing through the sensing region SA, or determines, through the infrared light, the access of an external object. FIG. 1A exemplarily illustrates the single sensing region SA. However, embodiments of the present disclosure are not necessarily limited thereto.

The display device DD may have a thickness direction parallel to a third directional axis DR3 that is the normal direction with respect to a plane defined by the first directional axis DR1 and the second directional axis DR2. The directions indicated by the first to third directional axes DR1, DR2, and DR3 as described in the specification are relative concepts, and may thus be changed to other directions. In addition, the directions indicated by the first to third direction axes DR1, DR2 and DR3 may be described as first to third directions, and the same reference symbols may be used. In the specification, the first directional axis DR1 and the second directional DR2 are orthogonal to each other, and the third directional axis DR3 may be the normal direction with respect to the plane defined by the first directional axis DR1 and the second directional axis DR2.

The display device DD may include a folding region FA and a plurality of non-folding regions, such as first and second non-folding regions NFA1 and NFA2. The first non-folding region NFA1, a folding region FA, and a second non-folding region NFA2 may be disposed in this order in the first directional axis DR1.

FIGS. 1A and 1B illustrate that the display device DD includes one folding region FA and two non-folding regions NFA1 and NFA2, but the number of folding and non-folding regions is not necessarily limited thereto. For example, in an embodiment the display device may include three or more non-folding regions and two or more folding regions disposed between adjacent non-folding regions.

As illustrated in FIG. 1B, the folding region FA may be folded with respect to a folding axis FX in parallel with the second directional axis DR2. The folding region FA may have a preset curvature and radius of curvature (RI). For example, in an embodiment the folding region FA may have a radius of curvature RI less than or equal to about 5 mm.

When the display device DD is folded, the non-folding regions, such as the first and second non-folding regions NFA1 and NFA2 may face each other. In a fully folded state of the display device DD, the display surface DS may not be exposed to the outside, which may be referred to as inner-folding. In an embodiment, in a fully folded state of the display device DD of an embodiment, the display surface DS may be exposed to the outside, which may be referred to as outer-folding.

Figure 2:
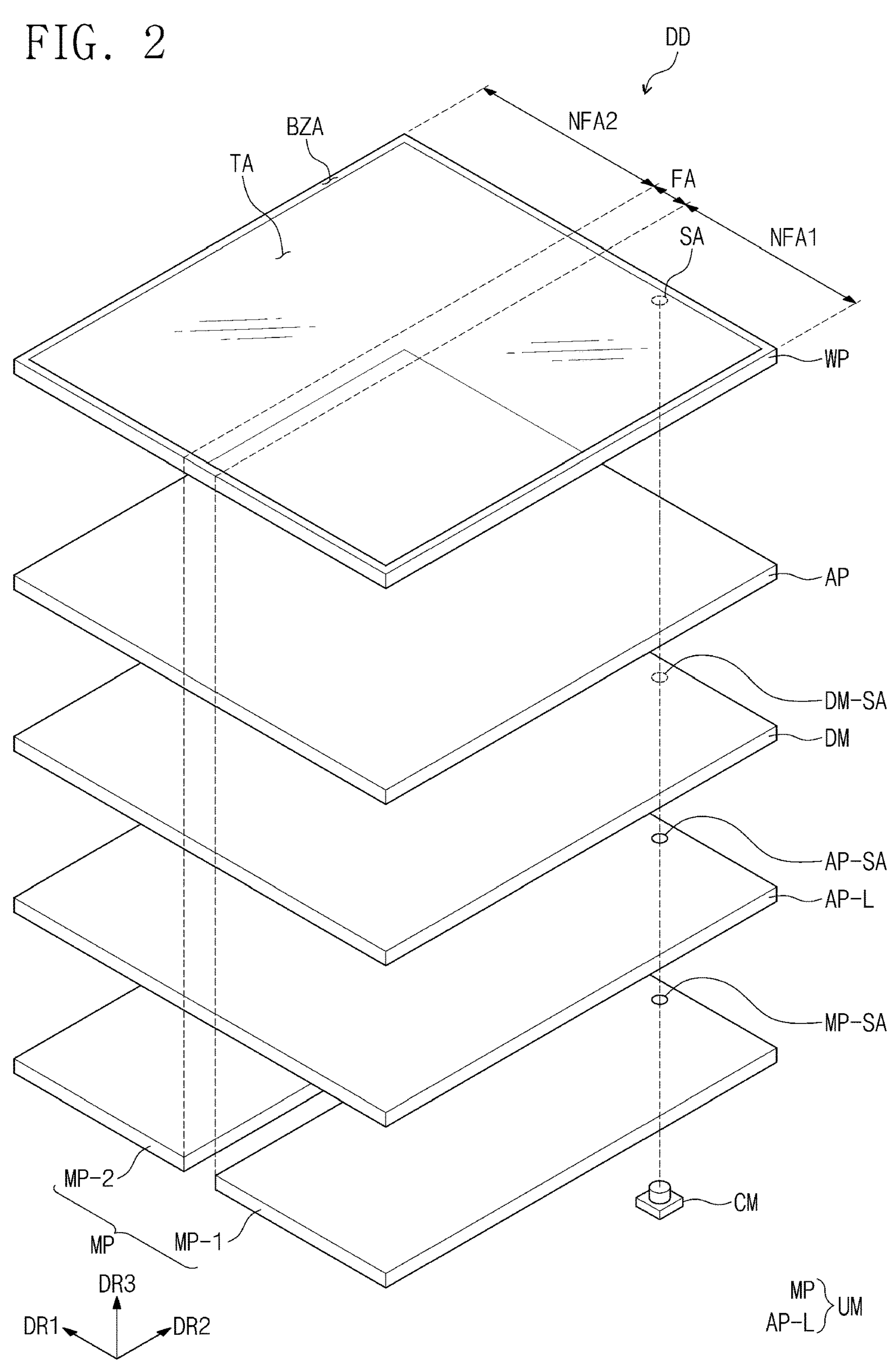
FIG. 2 is an exploded perspective view of a display device according to an embodiment of the present disclosure.
Figure 3:
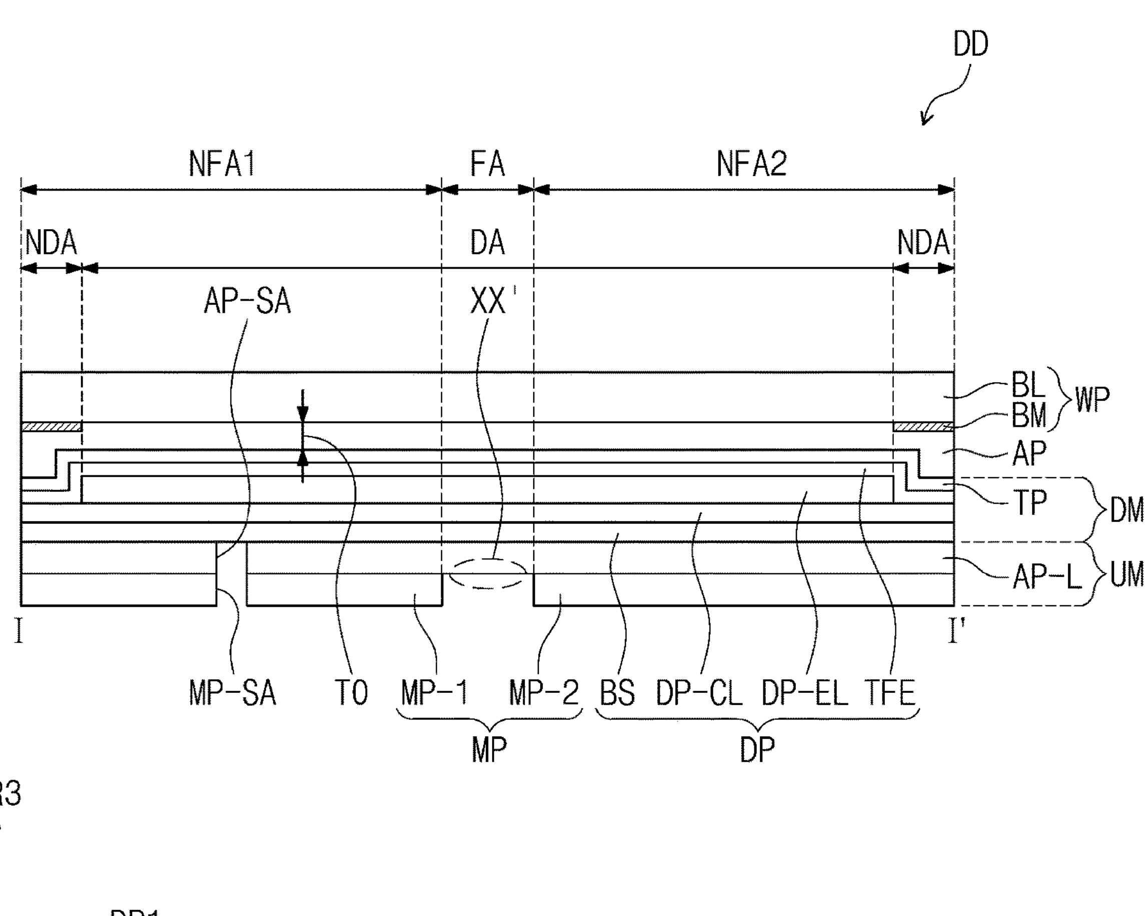
FIG. 3 is a cross-sectional view of a display device taken along line I-I' of FIG. 1A according to an embodiment of the present disclosure.

FIG. 2 is an exploded perspective view of a display device DD according to an embodiment. FIG. 3 illustrates a portion corresponding to line I-I' of FIG. 1A, and is a cross-sectional view of the display device DD according to an embodiment.

The display device DD of an embodiment may include a lower module UM, a display module DM disposed on the lower module UM, and a window WP disposed on the display module DM. In the display device DD of an embodiment as shown in FIG. 3, the display module DM may include a display panel DP including a display element layer DP-EL, and an input sensing unit TP disposed on the display panel DP. The display device DD of an embodiment may include an adhesive member AP disposed between the display panel DP and the window WP. For example, the adhesive member AP may be disposed between the input sensing unit TP and the window WP (e.g., in the third direction DR3).

The lower module UM may include a support plate MP and a lower adhesive layer AP-L. The support plate MP may support the components such as the display module DM disposed on the upper portion of the support plate MP. The support plate MP may include a first support plate MP-1 and a second support plate MP-2 which are spaced apart from the folding region FA. The first support plate MP-1 may overlap the first non-folding region NFA1, and the second support plate MP-2 may overlap the second non-folding region NFA2. An auxiliary opening MP-SA overlapping the sensing region SA may be defined in the first support plate MP-1. The auxiliary opening MP-SA may pass through the top and bottom surfaces of the first support plate MP-1.

The lower adhesive layer AP-L may be disposed on at least one of the lower portion or upper portion of the support plate MP. FIG. 2 illustrates that the lower adhesive layer AP-L is disposed on the upper portion of the support plate MP. However, embodiments of the present disclosure are not necessarily limited thereto, and the lower adhesive layer AP-L may be disposed on the lower portion of the support plate MP, or may be disposed on each of the upper portion and lower portion of the support plate MP. An opening AP-SA overlapping the sensing region SA may be defined in the lower adhesive layer AP-L. The opening AP-SA may pass through the top and bottom surfaces of the lower adhesive layer AP-L. The lower adhesive layer AP-L may include a polymer derived from the resin composition of an embodiment, which will be described later.

In addition, the display device DD may include an electronic module CM disposed to overlap the sensing region SA. The electronic module CM may be an electronic component that outputs or receives a light signal. In an embodiment, the electronic module CM may include a camera module and/or a proximity sensor. The camera module may take an external image through a sensing unit DM-SA of the display module DM. The sensing unit DM-SA of the display module DM may correspond to the sensing region SA in FIG. 1A.

The adhesive member AP may include the polymer derived from the resin composition of an embodiment. The resin composition of an embodiment may include at least one (meth)acrylate monomer, a plurality of bifunctional urethane (meth)acrylates, and at least one photoinitiator. In the specification, the term "bifunctional" refers to including two functional groups. In addition, in the specification, the term (meth)acrylate includes acrylate or methacrylate.

The resin composition of an embodiment may include at least two bifunctional urethane (meth)acrylates. The bifunctional urethane (meth)acrylates may include a first bifunctional urethane (meth)acrylate and a second bifunctional urethane (meth)acrylate. The first bifunctional urethane (meth)acrylate may have a first weight average molecular weight (Mw), and the second bifunctional urethane (meth) acrylate may have a second weight average molecular weight. The second weight average molecular weight may be higher than the first weight average molecular weight. The first bifunctional urethane (meth)acrylate may have a first weight with respect to the total weight of the resin composition. The second bifunctional urethane (meth)acrylate may have a second weight with respect to the total weight of the resin composition. The first weight may be greater than or equal to the second weight. For example, the first bifunctional urethane (meth)acrylate having a lower weight average molecular weight among the first and second bifunctional urethane (meth)acrylates may have a weight greater than or equal to the second bifunctional urethane (meth)acrylate.

The resin composition of an embodiment may include a plurality of bifunctional urethane (meth)acrylates, and at least one bifunctional urethane (meth)acrylate may have a different weight average molecular weight. Among the plurality of bifunctional urethane (meth)acrylates, the bifunctional urethane (meth)acrylate having a lower weight average molecular weight may have a weight greater than or equal to the bifunctional urethane (meth)acrylate having a higher weight average molecular weight.

In an embodiment, a liquid resin composition may be provided by an inkjet printing method, and the liquid resin composition may be photo-cured to be formed as the adhesive member AP. The resin composition of an embodiment may reduce a deformation in shape of the adhesive member AP formed from the resin composition because among the plurality of bifunctional urethane (meth)acrylates, the bifunctional urethane (meth)acrylate having a lower weight average molecular weight has a weight greater than or equal to the bifunctional urethane (meth)acrylate having a higher weight average molecular weight with respect to the total weight of the resin composition. Accordingly, the display device DD including the adhesive member AP formed from the resin composition may have an increased reliability.

In a comparative embodiment of an adhesive member formed from a resin composition in which the bifunctional urethane (meth)acrylate having a lower weight average molecular weight is included in less weight than the bifunctional urethane (meth)acrylate having a higher weight average molecular weight, may have a significant deformation in shape when pressure for adhesion is applied. The adhesive member having a significant deformation in shape may have the occurrence of a flow, etc. in a region XX' (FIG. 3) between the first support plate MP-1 and the second support plate MP-2. The flow of the adhesive member means a phenomenon in which the adhesive member flows out of a region where the adhesive member is intended to be provided.

The resin composition of an embodiment may include three bifunctional urethane (meth)acrylates. In the resin composition including the first to third bifunctional urethane (meth)acrylates, the first bifunctional urethane (meth)acrylate may have the first weight average molecular weight, the second bifunctional urethane (meth)acrylate may have the second weight average molecular weight, and the third bifunctional urethane (meth)acrylate may have a third weight average molecular weight. The first weight average molecular weight may be lower than the second weight average molecular weight, and the first weight average molecular weight may be the same as the third weight average molecular weight. The first weight of the first bifunctional urethane (meth)acrylate may be greater than the second weight of the second bifunctional urethane (meth) acrylate. The third weight of the third bifunctional urethane (meth)acrylate may be the same as the second weight. However, embodiments of the present disclosure are not limited thereto, and when the resin composition of an embodiment includes at least three bifunctional urethane (meth)acrylates, the weight average molecular weight and weight may vary.

In an embodiment, the resin composition may include bifunctional urethane (meth)acrylates having a molecular weight greater than or equal to about 10,000 and less than about 40,000. For example, the resin composition may include bifunctional urethane (meth)acrylates having a molecular weight in a range of about 10,000 to about 39,999. The bifunctional urethane (meth)acrylates may include the first bifunctional urethane (meth)acrylate and the second bifunctional urethane (meth)acrylate. In an embodiment, the first weight average molecular weight of the first bifunctional urethane (meth)acrylate may be greater than or equal to about 10,000 and less than about 20,000. For example, the first weight average molecular weight of the first bifunctional urethane (meth)acrylate may be in a range of about 10,000 to about 19,999. The second weight average molecular weight of the second bifunctional urethane (meth)acrylate may be greater than or equal to about 20,000 and less than about 40,000. For example, the second weight average molecular weight of the second bifunctional urethane (meth) acrylate may be in a range of about 20,000 to about 39,999.

The weight average molecular weight of the bifunctional urethane (meth)acrylate having a lower weight average molecular weight among the bifunctional urethane (meth) acrylates may be greater than or equal to about 10,000 and less than 20,000. For example, the weight average molecular weight of the bifunctional urethane (meth)acrylate having a lower weight average molecular weight among the bifunctional urethane (meth)acrylates may be in a range of about 10,000 to about 19,999. The weight average molecular weight of the bifunctional urethane (meth)acrylate having a higher weight average molecular weight among the bifunctional urethane (meth)acrylates may be greater than or equal to about 20,000 and less than about 40,000. For example, the weight average molecular weight of the bifunctional urethane (meth)acrylate having a higher weight average molecular weight among the bifunctional urethane (meth) acrylates may be in a range of about 20,000 to about 39,999. The adhesive member AP formed from the resin composition including the first bifunctional urethane (meth)acrylate having a weight average molecular weight greater than or equal to about 10,000 and less than about 20,000 and the second bifunctional urethane (meth)acrylate having a weight average molecular weight greater than or equal to about 20,000 and less than about 40,000 may exhibit high reliability.

On the contrary, an adhesive member in a comparative embodiment formed from a resin composition including the bifunctional urethane (meth)acrylate having a weight average molecular weight of less than about 10,000 may have low adhesive reliability, and may exhibit a deformation in shape of the opening in the adhesive member when pressure for adhesion is applied. The adhesive member formed from the resin composition including the bifunctional urethane (meth)acrylate having a weight average molecular weight greater than or equal to about 10,000 and less than about 20,000 and not including the bifunctional urethane (meth) acrylate having a weight average molecular weight greater than or equal to about 20,000 and less than about 40,000 may have low adhesive reliability, and may be deformed or peeled off upon repeated folding and unfolding. The adhesive member formed from the resin composition including the bifunctional urethane (meth)acrylate having a weight average molecular weight greater than or equal to about 20,000 and less than about 40,000 and not including the bifunctional urethane (meth)acrylate having a weight average molecular weight greater than or equal to about 10,000 and less than about 20,000 may have a deformation in shape of the opening in the adhesive member when pressure for adhesion with an adherend is applied.

In an embodiment, the first weight of the first bifunctional urethane (meth)acrylate having a weight average molecular weight greater than or equal to about 10,000 and less than about 20,000 may be in greater than or equal to about 5 wto and less than about 12 wt % with respect to the total weight of the resin composition. For example, the first weight of the first bifunctional urethane (meth)acrylate may be about 6 wt % to about 11 wt % with respect to the total weight of the resin composition. The second weight of the second bifunctional urethane (meth)acrylate having a weight average molecular weight greater than or equal to about 20,000 and less than about 40,000 may be greater than or equal to about 3 wt % and less than about 6 wt % with respect to the total weight of the resin composition. For example, the second weight of the second bifunctional urethane (meth)acrylate may be in a range of about 3 wt % to about 5 wt % with respect to the total weight of the resin composition. With respect to the total weight of the resin composition, the first bifunctional urethane (meth)acrylate having a lower weight average molecular weight may have a weight greater than or equal to the second bifunctional urethane (meth)acrylate having a higher weight average molecular weight. The first weight may be greater than or equal to the second weight.

In an embodiment, the sum of the weights of the first bifunctional urethane (meth)acrylate and the second bifunctional urethane (meth)acrylate may be greater than or equal to about 11 wt % and less than about 15 wt % with respect to the total weight of the resin composition. For example, the sum of the weights of the first bifunctional urethane (meth) acrylate and the second bifunctional urethane (meth)acrylate may be in a range of about 11 wt % to about 14.9 wt % with respect to the total weight of the resin composition. In addition, the sum of the weights of the first to third bifunctional urethane (meth)acrylates may be greater than or equal to about 11 wt % and less than about 15 wt % with respect to the total weight of the resin composition. For example, the sum of the weights of the first to third bifunctional urethane (meth)acrylates may be in a range of about 11 wt % to about 14.9 wt % with respect to the total weight of the resin composition. The adhesive member formed from the resin composition including about 15 wt % or more of the bifunctional urethane (meth)acrylate may have low adhesive reliability or may be deformed when pressure for adhesion with an adherend is applied. Therefore, the adhesive member AP formed from the resin composition of an embodiment including greater than or equal to about 11 wt % and less than about 15 wt % of the bifunctional urethane (meth) acrylate, with respect to the total weight of the resin composition, may exhibit high reliability.

The bifunctional urethane (meth)acrylates may include a polyether-based urethane (meth)acrylate. The resin composition of an embodiment may include a urethane (meth) acrylate including an ether bond. For example, the resin composition may include, as a bifunctional urethane (meth) acrylate, at least one of UF-C051 (KYOEISHA CHEMICAL Co., Ltd.), UF-C052 (KYOEISHA CHEMICAL Co., Ltd.), UV-3700B (Mitsubishi Chemical Corporation), UN6207 (Negami Chemical Industrial), or UN6304 (Negami Chemical Industrial). However, embodiments of the present disclosure are not necessarily limited thereto, and the bifunctional urethane (meth)acrylate included in the resin composition may vary.

The resin composition may include at least one (meth) acrylate monomer. The sum of the weights of the plurality of (meth)acrylate monomers may be in a range of about 83 wt % to about 90 wt % with respect to the total weight of the resin composition. For example, the resin composition may include a plurality of (meth)acrylate monomers. More specifically, the resin composition may include four (meth) acrylate monomers. The sum of the weights of the four (meth)acrylate monomers may be in a range of about 83 wt % to about 89 wt % with respect to the total weight of the resin composition. However, embodiments of the present disclosure are not necessarily limited thereto and the number and weight of the (meth)acrylate monomer included in the resin composition may vary.

In an embodiment, the (meth)acrylate monomer may include at least one compound selected from a hydroxy group-containing (meth)acrylate, an alkyl (meth)acrylate, and an aromatic (meth)acrylate. For example, the (meth) acrylate monomer may include at least one compound selected from a 4-hydroxybutyl acrylate, 2-ethylhexyl acrylate, tetrahydrofurfuryl acrylate, and 2-ethylhexyl-diglycol acrylate. However, embodiments of the present disclosure are not necessarily limited thereto and the (meth)acrylate monomer included in the resin composition may vary.

In the resin composition, the (meth)acrylate monomer may contain at least one (meth)acryloyl group. In the present specification, the term "(meth)acryloyl group" refers to either acryloyl group or methacryloyl group, and the term "(meth)acrylic" refers to either acrylic or methacrylic.

In the resin composition, the (meth)acrylate monomer may contain at least one acryloyl group or at least one methacryloyl group per monomer unit. For example, the (meth)acrylate monomer may be an acrylate monomer or a methacrylate monomer containing one acryloyl group or one methacryloyl group.

The resin composition may include a photoinitiator. In an embodiment in which the resin composition includes a plurality of photoinitiators, different photoinitiators may be activated by ultraviolet rays having different center wavelengths.

For example, in an embodiment the photoinitiator may include at least one compound selected from 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, and 2-hydroxy-1-{4-[4-(2-hydroxy-2-methylpropionyl)-benzyl]-phenyl}-2-methylpropan-1-one.

In addition, the photoinitiator may include at least one compound selected from 2-methyl-1[4-(methylthio)phenyl]-2-morpholinopropan-1-one, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, ethyl(2,4,6-trimethylbenzoyl)phenyl phosphinate, bis(2,4,6-trimethylbenzoyl)-phenylphosphineoxide, 4-phenylsulfanylbenzoyl)heptylideneamino]benzoate, [1-[9-ethyl-6-(2-methylbenzoyl)carbazol-3-yl]ethylideneamino]acetate, and bis(2,4-cyclopentadienyl)bis[2,6-difluoro-3-(1-pyrryl)phenyl]titanium(IV).

In an embodiment, the resin composition of an embodiment may have a viscosity in a range of about 8 mPa·s to about 50 mPa·s at about 25° C. as measured according to JIS Z8803 method. For example, the resin composition may have a viscosity in a range of about 12 mPa·s to about 22 mPa·s at about 25° C. as measured according to JIS Z8803 method.

The resin composition having a viscosity in a range of about 8 mPa·s to about 50 mPa·s may be provided by a method such as an inkjet printing method or a dispensing method. The resin composition having a viscosity in a range of about 8 mPa·s to about 50 mPa·s may be provided in a liquid phase, and the liquid resin composition may be suitable for being applied by an inkjet printing device, a dispenser, or the like.

The adhesive member AP formed from the resin composition of an embodiment may have a 180 degree peel strength with respect to a polymer substrate of about 800 gf/25 mm or more. The adhesive member AP formed from the resin composition of an embodiment may have a storage modulus greater than about 0.01 MPa and less than or equal to about 0.1 MPa at about 25° C. as measured according to JIS K7244-7 method. For example, the adhesive member AP may have a storage modulus in a range of about 0.02 MPa to about 0.04 MPa at about 25° C. as measured according to JIS K7244-7 method.

The adhesive member AP formed from the resin composition including the above-described plurality of bifunctional urethane (meth)acrylates may exhibit characteristics in which the 180 degree peel strength and storage modulus are excellent. Accordingly, the display device DD including the adhesive member AP may exhibit increased reliability upon repeated folding and unfolding. The adhesive member having a 180 degree peel strength of less than about 800 gf/25 mm or having a storage modulus of greater than about 0.1 MPa may be deformed or peeled off from the adherend upon repeated folding and unfolding.

In an embodiment, the resin composition of an embodiment may further include additives such as a viscosity adjusting agent, a peel adjusting agent, a tackifier, a plasticizer, a softener, and a cross-linking agent. The additives may be used within a range that does not change the physical properties of the resin composition as described above. For example, the resin composition may further include a cross-linking agent such as 3-glycidoxypropyltrimethoxysilane. For example, the resin composition may include about 0.1 wt % of 3-glycidoxypropyltrimethoxysilane with respect to the total weight of the resin composition. However, embodiments of the present disclosure are not necessarily limited thereto, and the composition and weight of the additives included in the resin composition may vary.

Referring to FIG. 3, the display panel DP may include a base substrate BS, a circuit layer DP-CL disposed on the base substrate BS, a display element layer DP-EL disposed on the circuit layer DP-CL, and an encapsulation layer TFE covering the display element layer DP-EL. For example, the display panel DP may include a plurality of organic light emitting elements or a plurality of quantum dot light emitting elements in the display element layer DP-EL. The circuit layer DP-CL may include a plurality of transistors.

However, embodiments of the present disclosure are not necessarily limited to the configuration of the display panel DP shown in FIG. 3, and the configuration of the display panel DP may vary. For example, the display panel DP may include a liquid crystal display element, and in this embodiment, the encapsulation layer TFE may be omitted.

The display device DD may further include an input sensing unit TP disposed on the display panel DP. For example, in an embodiment the input sensing unit TP may be directly disposed on the encapsulation layer TFE of the display panel DP. The input sensing unit TP may detect an external input, convert the external input to a predetermined input signal, and provide the input signal for the display panel DP. For example, in the display device DD of an embodiment, the input sensing unit TP may be a touch sensing unit that senses a touch. In an embodiment, the input sensing unit TP may recognize a user's direct touch, a user's indirect touch, a direct touch of an object, and/or an indirect touch of an object.

In an embodiment, the input sensing unit TP may sense at least one of a location of a touch or strength (pressure) of a touch applied from the outside. The input sensing unit TP may have various structures or may be formed of various materials, and is not limited to any one embodiment. The input sensing unit TP may include a plurality of sensing electrodes so as to sense an external input. The sensing electrodes may sense the external input in a capacitive manner. The display panel DP may receive an input signal from the input sensing unit TP, and generate an image corresponding to the input signal.

The window WP may protect the display panel DP, the input sensing unit TP, and the like. The image IM generated in the display panel DP may be provided to a user by being transmitted through the window WP. The window WP may provide a touch surface of the display device DD. In an embodiment of the display device DD that includes the folding region FA, the window WP may be a flexible window.

The window WP (see FIG. 2) may include a transmission region TA and a bezel region BZA. The front surface of the window WP including the transmission region TA and the bezel region BZA corresponds to the front surface of the display device DD.

The transmission region TA may be an optically clear region. The bezel region BZA may have light transmittance that is relatively lower than the light transmittance of the transmission region TA. The bezel region BZA may have a certain color. The bezel region BZA may be adjacent to the transmission region TA, and may surround the transmission region TA (e.g., in the first and second directions DR1, DR2). The bezel region BZA may define the shape of the transmission region TA. However, embodiments of the present disclosure are not necessarily limited to the one illustrated in FIG. 2. For example, in an embodiment the bezel region BZA may be disposed adjacent to only one side of the transmission region TA, and a part thereof may be omitted.

The window WP (see FIG. 3) may include a base layer BL and a printing layer BM. In an embodiment, the base layer BL may be a glass or plastic substrate. For example, a tempered glass substrate may be used in the base layer BL. Alternatively, the base layer BL may be formed of a flexible polymer resin. For example, the base layer BL may be formed of polyimide, polyacrylate, polymethylmethacrylate, polycarbonate, polyethylenenaphthalate, polyvinylidene chloride, polyvinylidene difluoride, polystyrene, ethylene-vinyl alcohol copolymer, or a combination thereof. However, embodiments of the present disclosure are not necessarily limited thereto, and a general form known as the base layer BL of the window WP in the art may be used without limitation.

The printing layer BM may be disposed on one surface of the base layer BL. The printing layer BM may be provided on the bottom surface of the base layer BL adjacent to the display module DM. The printing layer BM may be disposed on an edge area of the base layer BL. In an embodiment, the printing layer BM may be an ink printing layer. In addition, the printing layer BM may be a layer including a pigment or a dye. In the window WP, the bezel region BZA (see FIG. 2) may be a portion in which the printing layer BM is provided.

In an embodiment, the window WP may further include at least one functional layer provided on the base layer BL. For example, the functional layer may be a hard coating layer, an anti-fingerprint coating layer, etc., but embodiments of the present disclosure are not necessarily limited thereto.

The adhesive member AP included in the display device DD of an embodiment may be formed by providing a liquid resin composition on one surface of the window WP or the display module DM and by UV-curing the liquid resin composition provided between the window WP and the display module DM. In an embodiment, the adhesive member AP may be provided in a method in which the adhesive member AP is formed by UV-curing the liquid resin composition in a separate process, one surface of the adhesive member AP cured in the form of an adhesive film is laminated on one surface of the window WP or the display module DM, and one unattached surface of the window WP or the display module DM is attached on the other surface of the adhesive member AP. The one surface of the display module DM may be the top surface or bottom surface of the display module DM, or may be one surface (e.g., top surface or bottom surface) of the display panel DP included in the display module DM.

In an embodiment, the thickness TO of the adhesive member AP may be in a range of about 50 μm to about 200 μm. For example, the adhesive member AP may have a thickness T0 in a range of about 100 μm to about 150 μm. However, embodiments of the present disclosure are not necessarily limited thereto and the thickness TO of the adhesive member AP may vary.

Figure 4A:
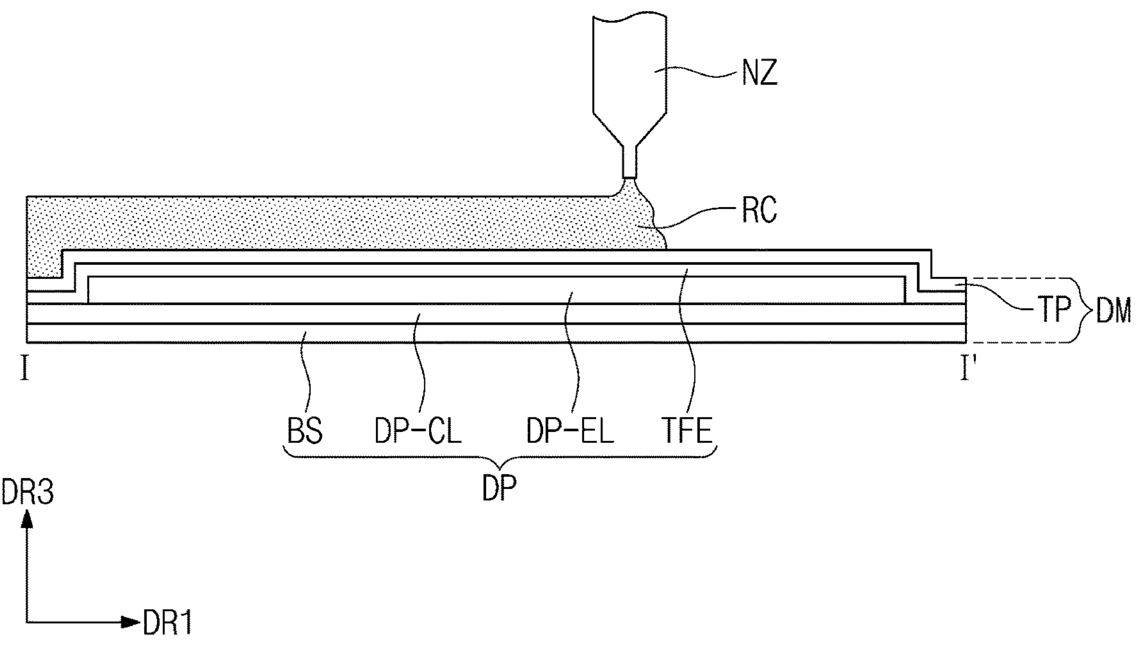
FIG. 4A is a cross-sectional view taken along line I-I' of FIG. 1A illustrating a method of manufacturing an adhesive member according to an embodiment of the present disclosure.
Figure 4B:
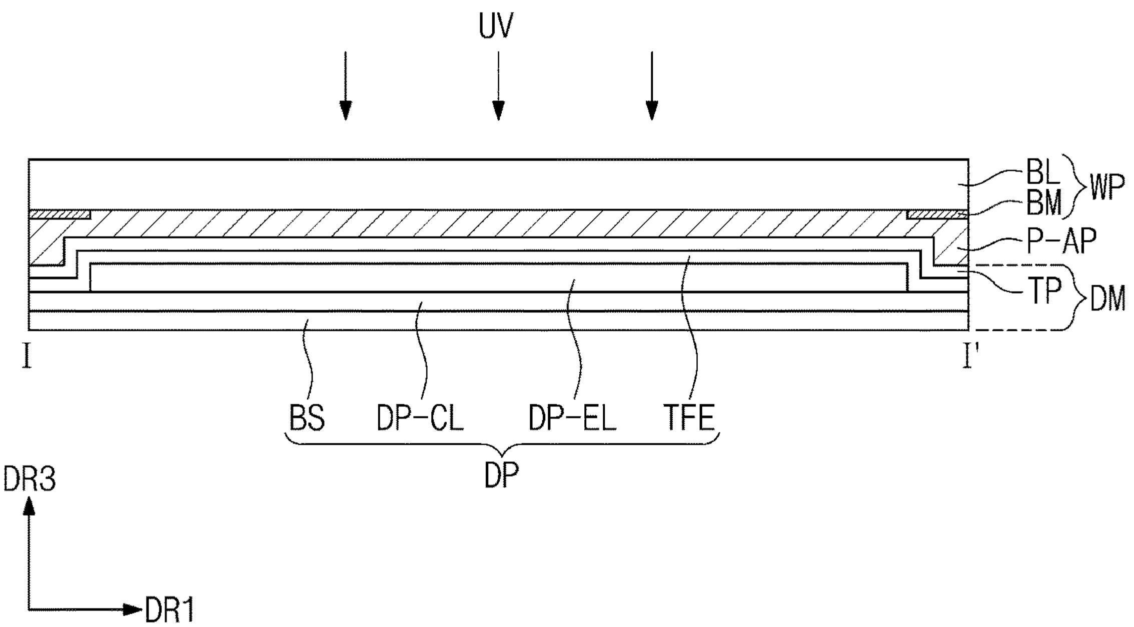
FIG. 4B is a cross-sectional view taken along line I-I' of FIG. 1A illustrating a method of manufacturing an adhesive member according to an embodiment of the present disclosure.

FIGS. 4A and 4B are views schematically illustrating a method of manufacturing an adhesive member AP according to an embodiment. FIG. 4A illustrates providing a resin composition RC on a display module DM. FIG. 4B illustrates irradiating a preliminary adhesive member P-AP formed from the resin composition RC with ultraviolet light.

Referring to FIG. 4A, the liquid resin composition RC may be provided on the top surface of the display module DM. The resin composition RC of an embodiment may include at least one (meth)acrylate monomer, a plurality of bifunctional urethane (meth)acrylate, and at least one photoinitiator.

The resin composition RC may have a viscosity in a range of about 8 mPa·s to about 50 mPa·s at about 25° C. as measured according to JISK2283 method, and may be provided through a nozzle NZ. The resin composition RC having a viscosity in a range of about 8 mPa·s to about 50 mPa·s may exhibit characteristics, in which the discharge from the nozzle NZ is easy, and the resin composition RC may be applied in a uniform thickness. In addition, the resin composition RC may be provided to form a thin adhesive member A P.

The window WP may be disposed on the preliminary adhesive member P-AP provided by applying the resin composition RC in a constant thickness. Ultraviolet light UV for curing the resin composition RC may be provided through the window WP. When the window WP is disposed on the preliminary adhesive member P-AP, the resin composition RC may be filled not to have an empty space. For example, since the resin composition RC has a low viscosity of about 50 mPa s or less, the preliminary adhesive member P-AP may be provided while covering the bent shapes in the bent portion between the base layer BL and the printing layer BM. The preliminary adhesive member P-AP may be polymerized and cured by the provided ultraviolet light UV to form an adhesive member AP. The final adhesive member AP (see FIG. 3) provided in the display device DD (see FIG. 3) may have a storage modulus greater than about 0.01 MPa and less than or equal to about 0.1 MPa at about 25° C. as measured according to JIS K7244-7 method. In addition, the final adhesive member AP (see FIG. 3) formed from the resin composition RC may have a 180 degree peel strength with respect to the polymer substrate of about 800 gf/25 mm or more.

Unlike the configuration illustrated in FIG. 4B, before the window WP is disposed on the preliminary adhesive member P-AP, the ultraviolet light UV may be provided on the preliminary adhesive member P-AP to perform the polymerization in the resin composition RC. The amount of ultraviolet light UV irradiated may be an amount of light that fully cures the resin composition RC. Alternatively, the polymerization of the resin composition RC may be partially performed in the preliminary adhesive member P-AP state, and then covered with the window WP, and the unreacted resin composition RC may be further reacted to form the final adhesive member AP.

Figure 5A:
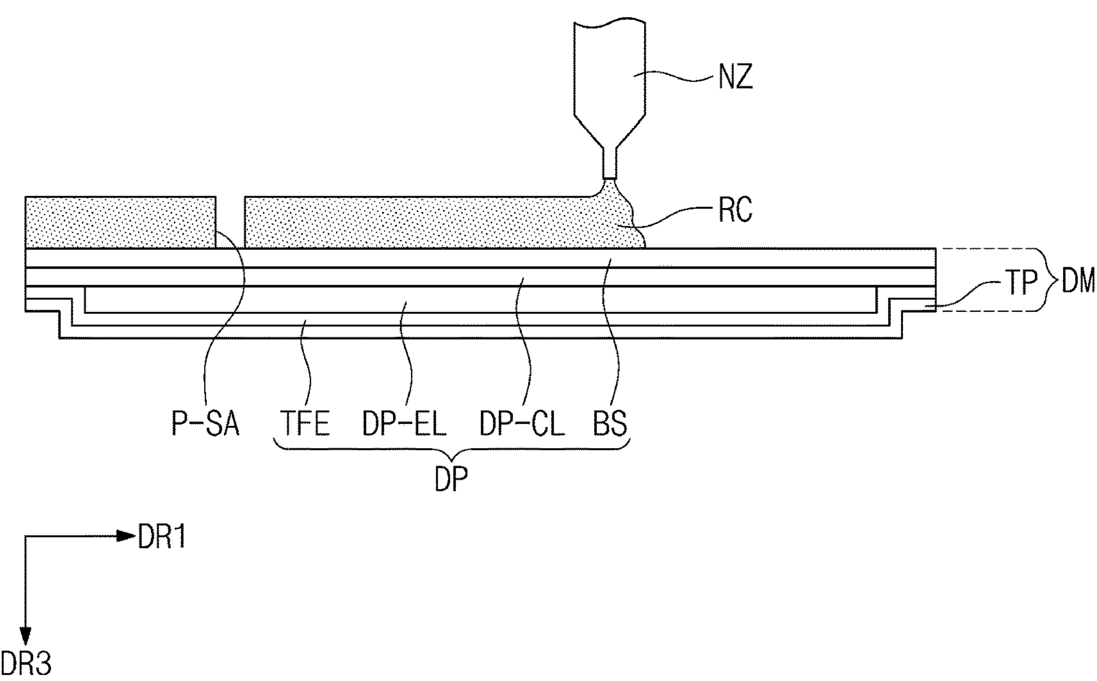
FIG. 5A is a cross-sectional view illustrating a method of manufacturing an adhesive member according to an embodiment of the present disclosure.
Figure 5B:
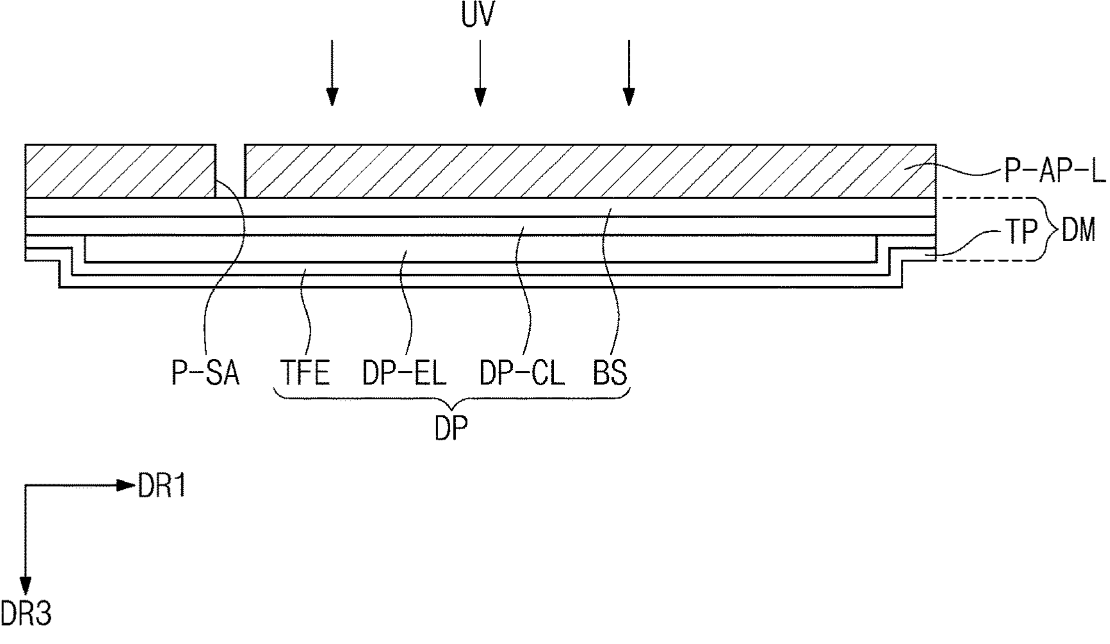
FIG. 5B is a cross-sectional view illustrating a method of manufacturing an adhesive member according to an embodiment of the present disclosure.

FIGS. 5A and 5B schematically illustrate a method of manufacturing a lower adhesive layer AP-L according to an embodiment. FIG. 5A illustrates providing a resin composition RC on the bottom surface of the display module DM. FIG. 5B illustrates irradiating a preliminary lower adhesive layer P-AP-L formed from the resin composition RC with ultraviolet light.

FIG. 5A illustrates that the resin composition RC is provided on the bottom surface of the display module DM. Referring to FIG. 5B, the ultraviolet light UV may be provided on the preliminary lower adhesive layer P-AP-L provided by applying the resin composition RC in a constant thickness. The preliminary lower adhesive layer P-AP-L may be cured by the ultraviolet light UV to form the final lower adhesive layer AP-L (see FIG. 3). The final lower adhesive layer AP-L (see FIG. 3) may have a storage modulus greater than about 0.01 MPa and less than or equal to about 0.1 MPa at about 25° C. as measured according to JIS K7244-7 method. In addition, the final lower adhesive layer AP-L (see FIG. 3) formed from the resin composition RC may have a 180 degree peel strength with respect to the polymer substrate of about 800 gf/25 mm or more. Thus, the display device DD including the lower adhesive layer AP-L may exhibit characteristics in which the adhesive reliability and folding reliability are increased.

When the resin composition RC is provided on the bottom surface of the display module DM, a mask, etc. may be provided for a portion P-SA overlapping the sensing region SA (see FIG. 1A), and thus the resin composition RC may not be provided for the portion P-SA overlapping the sensing region SA (see FIG. 1A). Alternatively, the operation of the nozzle NZ may be controlled so that the resin composition RC is not provided for the portion P-SA overlapping the sensing region SA (see FIG. 1A). The opening AP-SA (see FIG. 2) may be formed in the portion for which the resin composition RC is not provided. However, embodiments of the present disclosure are not necessarily limited thereto.

In an embodiment, an adhesive member AP may include a polymer derived from the resin composition RC. The resin composition may include a plurality of bifunctional urethane (meth)acrylates having different molecular weights. The display device DD including the adhesive member AP may maintain the adhesion state of the window WP, the display module DM, etc. by using the adhesive member AP even in a folded state or bending region without delamination of the adhesive member AP.

Figure 6:
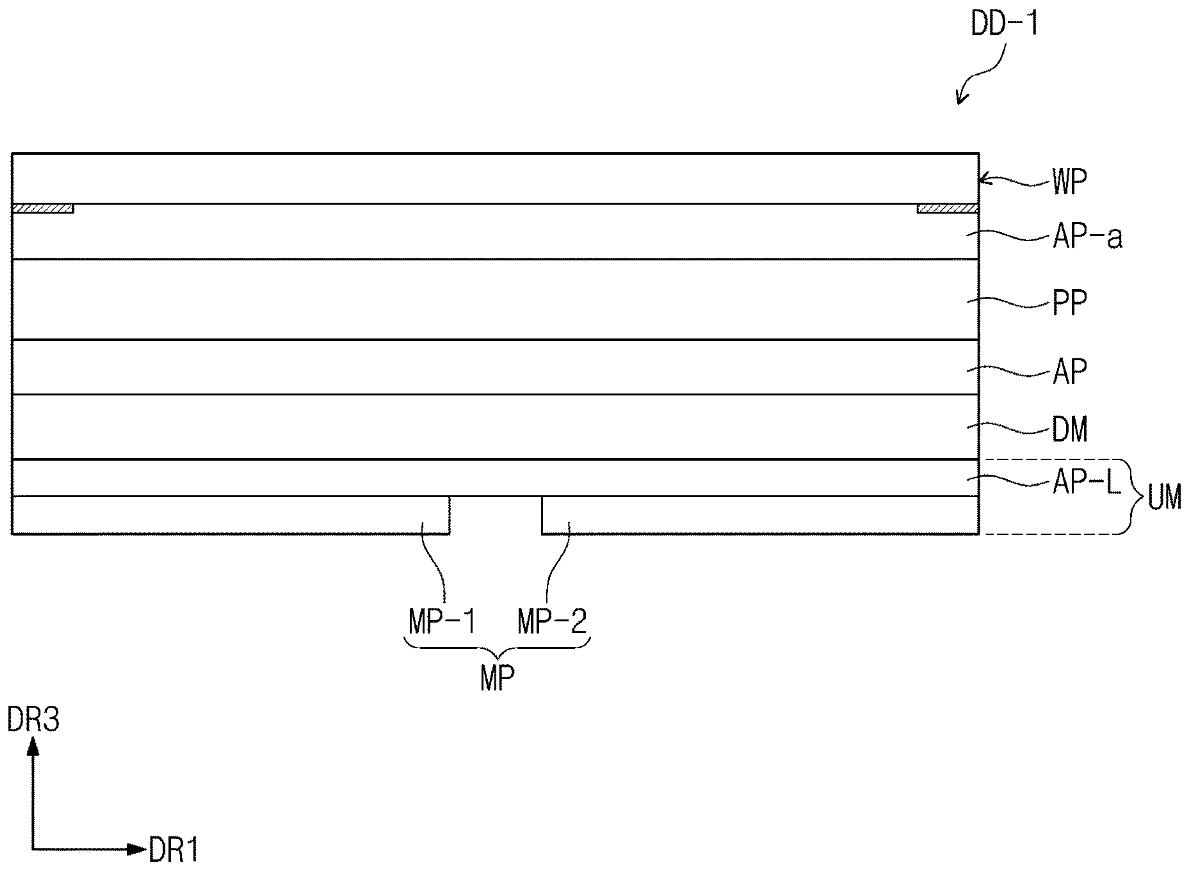
FIG. 6 is a cross-sectional view of a display device according to an embodiment of the present disclosure.

FIG. 6 is a cross-sectional view illustrating a display device according to an embodiment. Hereinafter, in describing the display device illustrated in FIG. 6, the duplicated features which have been described with reference to FIGS. 1A to SB are not described again, but their differences will be mainly described.

The display device DD-1 illustrated in FIG. 6 may further include a light control layer PP and an optical adhesive layer AP-a compared to the display device DD described with reference to FIGS. 2 and 3. The display device DD-1 of an embodiment may further include the light control layer PP disposed between the adhesive member AP and the window WP (e.g., in the third direction DR3), and the optical adhesive layer AP-a disposed between the light control layer PP and the window WP (e.g., in the third direction DR3).

The light control layer PP may be disposed on a display panel DP to control reflected light in the display panel DP due to external light. In an embodiment, the light control layer PP may include, for example, a polarization plate or a color filter layer.

The optical adhesive layer AP-a may be an optically clear adhesive film (OCA) or an optically clear adhesive resin layer (OCR). The optical adhesive layer AP-a may be formed from a resin composition RC according to an embodiment like the adhesive member AP (see FIG. 3) as described above. For example, the optical adhesive layer AP-a may include a polymer derived from the resin composition RC having a viscosity in a range of about 8 mPa·s to about 50 mPa·s at about 25° C. as measured according to JISK2283 method.

The optical adhesive layer AP-a formed from the resin composition RC according to an embodiment may have a 180 degree peel strength of about 800 gf/25 mm or more at about 25° C. The optical adhesive layer AP-a may have a storage modulus greater than about 0.01 MPa and less than or equal to about 0.1 MPa at about 25° C. as measured according to JIS K7244-7 method. Accordingly, the optical adhesive layer AP-a may exhibit excellent adhesive reliability. In addition, the display device DD-1 including the optical adhesive layer AP-a may exhibit increased reliability upon repeated folding and unfolding.

Figure 7:
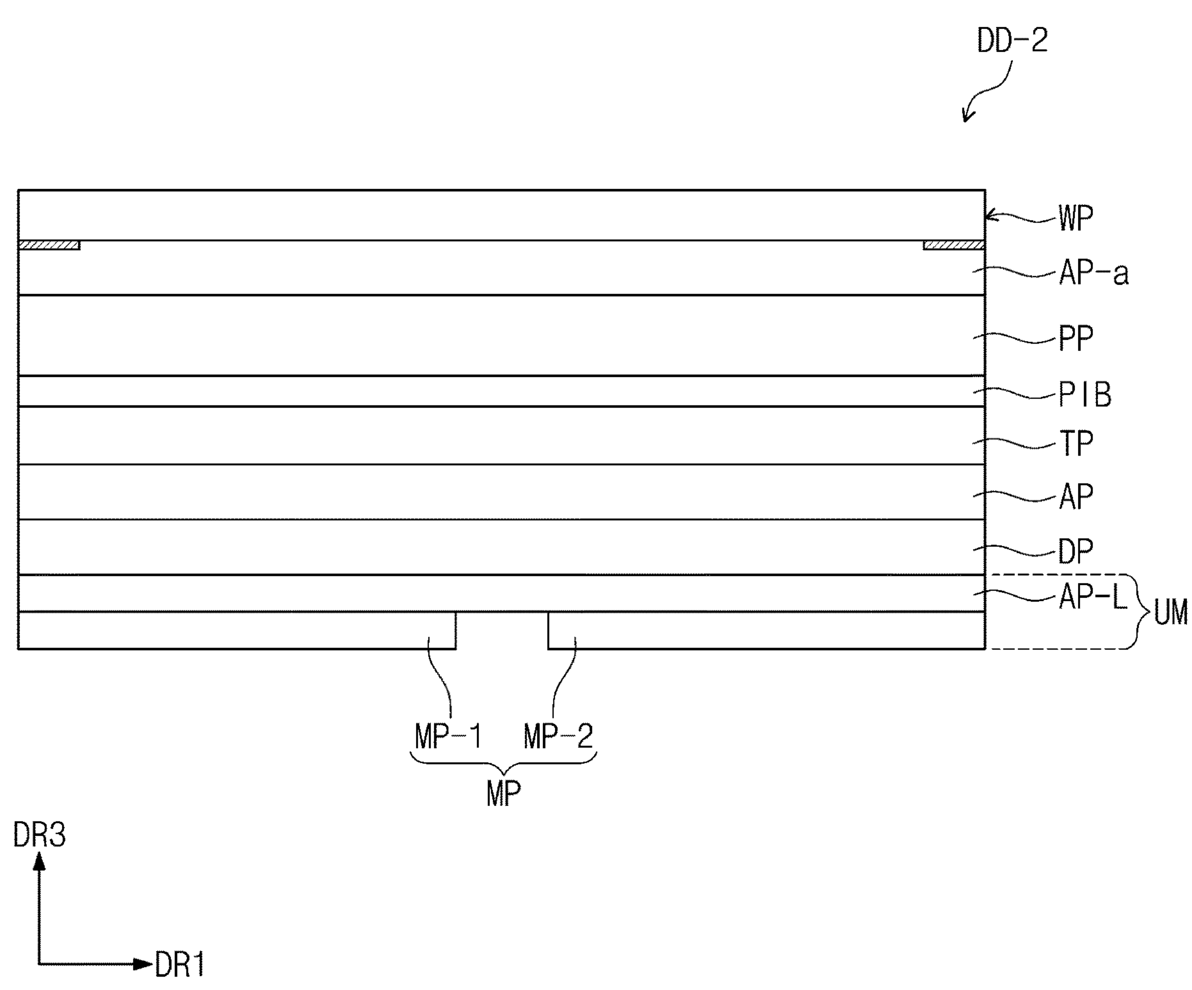
FIG. 7 is a cross-sectional view of a display device according to an embodiment of the present disclosure.

FIG. 7 is a cross-sectional view illustrating a display device according to an embodiment. Hereinafter, in describing the display device of an embodiment illustrated in FIG. 7, the duplicated features which have been described with reference to FIGS. 1A to 6 are not described again, but their differences will be mainly described.

The display device DD-2 of an embodiment illustrated in FIG. 7 may further include a light control layer PP, an optical adhesive layer AP-a, and an interlayer adhesive layer PIB compared to the display device DD described with reference to FIGS. 2 and 3. The display device DD-2 of an embodiment may further include a light control layer PP disposed between an adhesive member AP and a window WP (e.g., in the third direction DR3), and the optical adhesive layer AP-a disposed between the light control layer PP and the window WP (e.g., in the third direction DR3) like the display device DD-1 of an embodiment illustrated in FIG. 6.

For the display device DD-2 of an embodiment, the adhesive member AP may be provided between a display panel DP and an input sensing unit TP. For example, the input sensing unit TP may not be disposed directly on the display panel DP, and the display panel DP and the input sensing unit TP may be coupled to each other via the adhesive member AP. For example, the adhesive member AP may be disposed between the encapsulation layer TFE (see FIG. 3) of the display panel DP and the input sensing unit TP (e.g., in the third direction DR3).

The interlayer adhesive layer PIB may be disposed on the bottom side of the light control layer PP. The interlayer adhesive layer PIB may be disposed between the input sensing unit TP and the light control layer PP (e.g., in the third direction DR3), and be formed of an adhesive material having superior anti-moisture permeability. For example, the interlayer adhesive layer PIB may include polyisobutylene. The interlayer adhesive layer PIB may be disposed on the input sensing unit TP to prevent corrosion of sensing electrodes of the input sensing unit TP. The display device DD-2 of an embodiment may include the optical adhesive layer AP-a and the adhesive member AP formed from the resin composition RC of an embodiment, and the display device DD-2 including the optical adhesive layer AP-a and the adhesive member AP may exhibit excellent reliability upon repeated folding and unfolding.

Hereinafter, with reference to Examples and Comparative Examples, an adhesive member and a display device formed from a resin composition according to an embodiment of the present disclosure will be described in detail. In addition, Examples described below are only illustrations to assist the understanding of the present disclosure, and the scope of the present disclosure is not limited thereto.

EXAMPLES

1. Preparation of Resin Composition

Resin compositions of Examples and Comparative Examples were prepared with the compound ratio listed in Tables 1 and 2. Materials listed in Tables 1 and 2 were provided for a beat-resistant light-shielding container in a weight ratio of each material. In addition, Omnirad 819 (IGM Resin, Inc.) and Chivacure TPO-1. (Chitec Technology Co., Ltd) as photoinitiators were mixed at a weight ratio of about 3:7, and provided in an amount of about 4 wt % with respect to a total weight of the resin composition. Then, to uniformly mix the composition, the composition was stirred at room temperature to prepare the resin compositions of Examples and Comparative Examples.

TABLE 1

| Materials | Example 1 | Example 2 | Example 3 | Example 4 | Example 5 | Example 6 | Example 7 |
|---|---|---|---|---|---|---|---|
| UF-C051 | — | — | — | — | — | 5.0% | 3.0% |
| UF-C052 | — | — | — | — | — | — | 3.0% |
| UV3700B | — | — | — | — | — | — | — |
| UN6207 | 4.0% | 4.0% | 3.5% | 4.0% | 5.0% | — | — |
| UN6304 | 10.0% | 11.0% | 8.0% | 8.0% | 7.0% | 7.0% | 6.0% |
| UF-07DF | — | — | — | — | — | — | — |
| 4-HBA | 6.8% | 6.7% | 7.0% | 7.0% | 7.0% | 7.0% | 7.0% |
| 2-EHA | 43.5% | 52.5% | 54.5% | 54.0% | 54.2% | 54.1% | 53.7% |
| IDAA | — | — | — | — | — | — | — |
| THF-A | 14.5% | 14.4% | 15.0% | 15.0% | 15.0% | 15.0% | 15.0% |
| EHDG-AT | 21.0% | 11.2% | 11.8% | 11.8% | 11.6% | 11.6% | 12.0% |
| Viscoat#260 | — | — | — | — | — | — | — |
| JP-360 | 0.2% | 0.2% | 0.2% | 0.2% | 0.2% | 0.2% | 0.2% |
| KBM-403 | — | — | — | — | — | 0.1% | 0.1% |

TABLE 2

| Materials | Comparative Example 1 | Comparative Example 2 | Comparative Example 3 | Comparative Example 4 | Comparative Example 5 | Comparative Example 6 |
|---|---|---|---|---|---|---|
| UF-C051 | 15.50% | — | — | — | — | — |
| UF-C052 | — | — | — | — | — | — |
| UV3700B | — | — | — | 5.00% | 5.00% | — |
| UN6207 | — | 8.80% | — | — | — | — |
| UN6304 | — | 4.00% | 15.50% | — | — | — |
| UF-07DF | — | — | — | — | — | 15.0% |
| 4-HBA | 22.10% | 7.00% | 6.50% | 52.80% | 23.00% | 15.0% |
| 2-EHA | 62.00% | 48.00% | 38.40% | — | — | — |
| IDAA | — | — | — | 42.00% | 71.80% | 70.0% |
| THF-A | — | 15.00% | 14.40% | — | — | — |
| EHDG-AT | — | 17.00% | 25.00% | — | — | — |
| Viscoat#260 | 0.20% | — | — | — | — | — |
| JP-360 | 0.20% | 0.20% | 0.20% | 0.20% | 0.20% | — |
| KBM-403 | — | — | — | — | — | — |

Data about Tables 1 and 2 is as follows:

UF-C051 is urethane acrylate having a molecular weight of about 35,000 (KYOEISHA CHEMICAL Co., Ltd.)

UF-C052 is a urethane acrylate having a molecular weight of about 10,000 (KYOEISHA CHEMICAL Co., Ltd.)

UV-3700B is a urethane acrylate having a molecular weight of about 38,000 (Mitsubishi Chemical Corporation)

UN6207 is a urethane acrylate having a molecular weight of about 27,000 (Negami Chemical Industrial)

UN6304 is a urethane acrylate having a molecular weight of about 10,000 (Negami Chemical Industrial)

UF-07D is a urethane acrylate having a molecular weight of about 6,000 (KYOEISHA CHEMICAL Co., Ltd.)

4-HBA is 4-hydroxybutyl acrylate (Osaka Organic Chemical Industry Ltd.)

2-EHA is 2-ethylhexyl acrylate (TOAGOSEI Co., Ltd.)

IDAA is iso-decyl acrylate (Osaka Organic Chemical Industry Ltd.)

THF-A is tetrahydrofurfuryl acrylate (KYOEISHA CHEMICAL Co., Ltd.)

EHDG-AT is 2-ethylhexyl-diglycol acrylate (KYOEISHA CHEMICAL Co., Ltd.)

Viscoat #260 is 1,9-nonanediol diacrylate (Osaka Organic Chemical Industry Ltd.)

JP-360 is triphenylphosphite (JOHOKU CHEM ICAL Co., Ltd.)

KBM-403 is 3-glycidoxypropyltrimethoxysilane (SHIN-ETSU CHEMICAL Co., Ltd.)

In Tables 1 and 2, UF-C051, UF-C052, UV3700B, UN6207, UN6304, and UF-07DF correspond to the bifunctional urethane (meth)acrylate, 4-HBA, 2-EHA, IDAA, THF-A, and EHDG-AT correspond to the (meth)acrylate monomer. Viscoat #260, and KBM-403 are cross-linking agents, and JP-360 is an anti-oxygen inhibition agent that is used to prevent the inhibition of oxygen during the polymerization.

2. Evaluation of Physical Properties of Resin Composition and Adhesive Member Formed from Resin Composition Viscosities of the resin compositions of Examples in Table 1 and Comparative Examples in Table 2, and storage modulus and peel strength values of the adhesive members formed from the resin compositions were measured, and shape maintenance and folding reliability of the adhesive members formed from the resin compositions were evaluated, and the results are listed in Tables 3 and 4 below. The evaluation of the viscosity of the resin composition and the storage modulus, peel strength, shape maintenance, and folding reliability of the adhesive member formed from the resin composition was performed as follows.

Viscosity Measurement Method

The shear viscosity of the resin composition described in the present specification is measured by using JIS Z8803 method at about 25° C. at a speed of about 10 rpm by using a viscometer TVE-25L (TOKI SANGYO Co., Ltd.).

Storage Modulus Measurement Method

On a slide glass (made by Matsunami Glass Ind., Ltd., product name: Slide glass Sit 12), a PET film (made by PANAC Co., Ltd., product name: NP100A), on which release treatment was conducted, and a silicone rubber sheet (made by Tigers Polymer Corporation), through which a hole having a diameter of about 8 mm was formed, were sequentially stacked. The prepared resin composition (28 μL) was dropped in the hole of the silicone rubber sheet, and was irradiated with ultraviolet light to be a light integral of about 220 mJ/cm$^2$ and about 380 mJ/cm$^2$ by using a UV-LED lamp having peaks at about 405 nm and about 365 nm, respectively. After being irradiated with the ultraviolet light, a PET film (made by PANAC Co., Ltd., product name: NP100A), on which release treatment was conducted, and a slide glass (made by Matsunami Glass Ind., Ltd., product name: Slide glass S1112) were sequentially stacked. The stacked slide glass was irradiated with ultraviolet light of about 4,000 mJ/cm$^2$ by using a UV-LED lamp having a peak at about 395 nm. The resin composition was cured by the ultraviolet light to form a measurement sample having a diameter of about 8 mm and a thickness of about 500 μm. The storage modulus of the obtained sample was measured according to JIS K7244-7 method. More specifically, the storage modulus of the sample was measured under the conditions of a temperature of 25° C. and a frequency of 1 Hz using a rheometer MCR 302 (made by Anton-Paar).

Peel Strength Measurement Method

The prepared liquid resin composition was applied to Soda-lime glass (Central Glass Co., Ltd.) having a size of about 26 mm×76 mm to be a thickness of about 50 μm by using an inkjet device. DevicePrinter-CX (MICROJET Corporation) installed with KM1024i (Konica Minolta, Inc.) was used as the inkjet device.

The Soda-lime glass, on which the liquid resin composition was applied, was irradiated with the ultraviolet light to be a light integral of about 220 mJ/cm$^2$ and about 380 mJ/cm$^2$ by using the UV-LED lamp having peaks at about 405 nm and about 365 nm, respectively. A PET film (Toyobo Co., Ltd., product name: A4360, thickness: about 50 μm) cut into a size of about 20 mm×150 mm was provided for the Soda-lime glass irradiated with the ultraviolet light, which were attached by applying a pressure of about 0.15 MPa. Then, the PET film was irradiated with the ultraviolet light by using the UV-LED lamp having a peak at about 395 nm to be a light integral of about 4,000 mJ/cm$^2$, thus curing the resin composition, and thereby obtaining a sample. The peel strength of the obtained sample was measured three times at a speed of about 300 mm/min to be a peeling angle of about 180° by using a universal testing machine (Instron Corporation, product name: INSTRON 5965 system). An average value of about 50 mm peel was obtained, and the obtained value was multiplied by 1.25, and the peel strength with respect to the width of about 25 mm was recorded.

Folding Reliability Evaluation Method

The prepared resin composition was applied on a PET film (Toyobo Co., Ltd., product name: A4360, thickness: about 50 μm) to be a thickness of about 50 μm by using the inkjet device of Device Printer-CX (MICROJET Corporation) installed with KM1024i (Konica Minolta, Inc.). The PET film, on which the resin composition was applied, was irradiated with the ultraviolet light to be a light integral of about 220 mJ/cm$^2$ and about 380 mJ/cm$^2$ by using the UV-LED lamp having peaks at about 405 nm and about 365 nm, respectively. Another PET film (Toyobo Co., Ltd., product name: A4360, thickness: about 50 μm) was attached to the PET film, which was irradiated with the ultraviolet light, by applying a pressure of about 0.15 MPa. After the attachment, the PET film was irradiated with the ultraviolet light by using the UV-LED lamp having a peak at about 395 nm to be a light integral of about 4,000 mJ/cm$^2$, thereby curing the resin composition. Then, the cured product was cut into a width of about 50 mm and a length of about 200 mm to obtain a sample.

The obtained sample was repeatedly folded about 30,000 times under the conditions of about 23° C. and a curvature diameter of about 3 mm by using an endurance tester (YUASA SYSTEM Co., Ltd., Tension-free U-shape folding tester). After the termination of folding, the occurrence of peeling, delamination, deviation, etc. of the specimen was observed, and no occurrence of peeling, delamination, and deviation was recorded as "OK," and the occurrence of peeling, delamination, and deviation was recorded as "NG."

Shape Maintenance Evaluation Method

The prepared resin composition was applied on Soda-lime glass (made by CENTRAL GLASS Co., Ltd.) having a size of about 26 mm×76 mm to be a thickness of about 50 μm by using the inkjet device of Device Printer-CX (MICROJET Corporation) installed with KM1024i (Konica Minolta, Inc.). An uncoated portion having a diameter of about 2 mm was made at the central part of the applied layer.

The resin composition applied on the Soda-lime glass was irradiated with the ultraviolet light to be a light integral of about 220 mJ/cm$^2$ and about 380 mJ/cm$^2$ by using the UV-LED lamp having peaks at about 405 nm and about 365 nm, respectively. The diameter of the uncoated portion of the resin composition irradiated with the ultraviolet light was measured by using a digital microscope (Olympus Corporation, product name: DSX1000). Then, a PET film (Toyobo Co., Ltd., product name: A4360, thickness: about 50 μm) cut into a size of about 20 mm×150 mm was attached thereto by applying a pressure of about 0.15 MPa. After the attachment, on the PET film side, the diameter of the uncoated portion of the resin composition was measured by using the digital microscope (Olympus Corporation, product name: DSX1000). It was recorded as "0" that the ratio of the diameter measured before the attachment to the diameter measured after the attachment was greater than or equal to about 95% and less than about 105%. When the shape of the uncoated portion was changed after the attachment, the measurement after the attachment was not performed, and this was represented by "X".

TABLE 3

| Division | Example 1 | Example 2 | Example 3 | Example 4 | Example 5 | Example 6 | Example 7 |
|---|---|---|---|---|---|---|---|
| Viscosity (mPa · s) | 21 | 21 | 13 | 14 | 15 | 21 | 15 |
| Storage modulus (MPa) | 0.029 | 0.039 | 0.035 | 0.038 | 0.038 | 0.03 | 0.039 |
| Shape maintenance | ○ (100%) | ○ (100%) | ○ (100%) | ○ (100%) | ○ (100%) | ○ (100%) | ○ (100%) |
| Folding reliability | OK | OK | OK | OK | OK | OK | OK |
| Peel strength (gf/25 mm) | 1100 | 1300 | 1000 | 1000 | 800 | 980 | 1000 |

TABLE 4

| Division | Comparative Example 1 | Comparative Example 2 | Comparative Example 3 | Comparative Example 4 | Comparative Example 5 | Comparative Example 6 |
|---|---|---|---|---|---|---|
| Viscosity (mPa · s) | 32 | 18 | 30 | 12 | 9 | 8 |
| Storage modulus (MPa) | 0.045 | 0.03 | 0.019 | 0.11 | 0.01 | 0.08 |
| Shape maintenance | X | X | ○ (100%) | ○ (100%) | X | X |
| Folding reliability | OK | OK | OK | NG | NG | NG |
| Peel strength (gf/25 mm) | 1700 | 1000 | 600 | 1000 | 200 | 400 |

Referring to Table 3, it may be seen that the resin compositions of Examples 1 to 7 have a viscosity in a range of about 8 mPa·s to about 50 mPa·s. It may be seen that the adhesive members formed from the resin compositions of Examples 1 to 7 have a storage modulus greater than 0.01 MPa and less than or equal to about 0.1 MPa, and have a 180 degree peel strength of about 800 gf/25 mm or more. In addition, it may be seen that when the adhesive members formed from the resin compositions of Examples 1 to 7 was repeatedly folded and unfolded, the reliability was maintained, and when a pressure for attachment was applied, the shape of the opening was maintained.

The resin compositions of Examples 1 to 7 are the resin compositions according to embodiments of the present disclosure, and include two or three bifunctional urethane acrylates, and the bifunctional urethane acrylate having a lower weight average molecular weight has a weight equal to or greater than the bifunctional urethane acrylates having a higher weight average molecular weight (see Table 1). More specifically, for the resin compositions of Examples 1 to 6, the bifunctional urethane acrylate having a lower weight average molecular weight has a weight greater than the bifunctional urethane acrylate having a higher weight average molecular weight. Accordingly, it is believed that the adhesive member formed from the resin composition of an embodiment will exhibit characteristics in which the adhesive reliability and folding reliability are excellent. In addition, it is believed that the adhesive member which is formed from the resin composition of an example and in which openings are defined will exhibit characteristics in which shape reliability is excellent.

Referring to Table 4, it may be seen that for the adhesive members formed from the resin compositions of Comparative Examples 1, 2, 5, and 6, the shapes of the openings are deformed when a pressure for attachment is applied. The resin composition of Comparative Example 1 includes only one urethane acrylate, and the weight of the one urethane acrylate is about 15.5 wt % with respect to the total weight of the resin composition. The resin composition of Comparative Example 2 includes two urethane acrylates, but the urethane acrylate having a higher weight average molecular weight has a weight greater than the urethane acrylate having a lower weight average molecular weight.

In addition, it may be seen that the adhesive members formed from the resin compositions of Comparative Examples 5 and 6 have a 180 degree peel strength of less than about 800 gf/25 mm. The resin compositions of Comparative Examples 5 and 6 include only one urethane acrylate.

It may be seen that the adhesive member formed from the resin composition of Comparative Example 3 has a 180 degree peel strength of less than about 800 gf/25 mm. The resin composition of Comparative Example 3 includes one urethane acrylate, and the weight of the one urethane acrylate is about 15.5 wt % with respect to the total weight of the resin composition.

The adhesive member formed from the resin composition of Comparative Example 4 has a storage modulus of about 0.11 MPa, and has the occurrence of delamination, peeling, deviation, and the like upon repeated folding and unfolding. The resin composition of Comparative Example 4 includes only one urethane acrylate.

The display device of an embodiment may include a display panel, a window disposed on the display panel, and an adhesive member disposed between the display panel and the window. The adhesive member may include a polymer derived from the resin composition of an embodiment.

The resin composition of an embodiment may include at least one (meth)acrylate monomer, a plurality of bifunctional urethane (meth)acrylates, and at least one photoinitiator. The bifunctional urethane (meth)acrylates may include a first bifunctional urethane (meth)acrylate having a first weight average molecular weight and a second bifunctional urethane (meth)acrylate having a second weight average molecular weight higher than the first weight average molecular weight. The first weight of the first bifunctional urethane (meth)acrylate may be equal to or greater than the second weight of the second bifunctional urethane (meth) acrylate with respect to the total weight of the resin composition.

Accordingly, the adhesive member formed from the resin composition of an embodiment may exhibit characteristics in which the adhesive reliability and folding reliability are excellent. The adhesive member formed from the resin composition of an embodiment may maintain the shape when a pressure for attachment is applied. The display device of an embodiment including the adhesive member may exhibit increased reliability.

The resin composition of an embodiment may include a plurality of urethane (meth)acrylates having different molecular weights, thereby forming an adhesive member having excellent adhesive reliability and folding reliability.

The display device of an embodiment may include the adhesive member disposed between the display panel and the window, thereby exhibiting increased reliability.

Although the present disclosure has been described with reference to embodiments thereof, it will be understood that the present disclosure should not be limited to these embodiments but various changes and modifications can be made by those skilled in the art without departing from the spirit and scope of the present disclosure.

Accordingly, the technical scope of the present disclosure is not intended to be limited to the contents set forth in the detailed description of the specification, but is intended to be defined by the appended claims.

What is claimed is:

1. A display device comprising:

a display panel;

a window disposed on the display panel; and an adhesive member disposed between the display panel and the window, the adhesive member contains a polymer formed from a resin composition, the resin composition including at least one (meth)acrylate monomer, a plurality of bifunctional urethane (meth) acrylates, and at least one photoinitiator, wherein the plurality of bifunctional urethane (meth) acrylates includes a first bifunctional urethane (meth) acrylate having a first weight average molecular weight and a second bifunctional urethane (meth)acrylate having a second weight average molecular weight that is higher than the first weight average molecular weight, and a first weight of the first bifunctional urethane (meth)acrylate is greater than or equal to a second weight of the second bifunctional urethane (meth) acrylate with respect to a total weight of the resin composition.

2. The display device of claim 1, wherein the first weight average molecular weight is greater than or equal to 10,000 and less than 20,000 and the second weight average molecular weight is greater than or equal to 20,000 and less than 40,000.

3. The display device of claim 1, wherein a sum of the first weight and the second weight is greater than or equal to 11 wt % and less than 15 wt % with respect to the total weight of the resin composition, and wherein the first weight is greater than or equal to 5 wt % and less than 12 wt %, and the second weight is greater than or equal to 3 wt % and less than 6 wt %.

4. The display device of claim 1, wherein the adhesive member has a 180 degree peel strength with respect to a polymer substrate that is greater than or equal to 800 gf/25 mm.

5. The display device of claim 1, wherein the adhesive member has a storage modulus greater than 0.01 MPa and less than or equal to 0.1 MPa at 25° C. as measured according to JIS K7244-7 method.

6. The display device of claim 1, further comprising a lower module disposed under the display panel and including a support plate and a lower adhesive layer disposed on at least one of an upper portion or a lower portion of the support plate, wherein the lower adhesive layer includes the polymer formed from the resin composition.

7. The display device of claim 6, wherein at least one opening extending through a top surface and a bottom surface of the lower adhesive layer is defined in the lower adhesive layer.

8. The display device of claim 1, wherein the adhesive member is formed by providing the resin composition on one surface of the window or one surface of the display panel by an inkjet printing method or a dispensing method and by photo-curing the resin composition provided on the one surface of the window or the one surface of the display panel.

9. The display device of claim 1, further comprising a light control layer disposed between the adhesive member and the window and an optical adhesive layer disposed between the light control layer and the window, wherein the optical adhesive layer includes the polymer formed from the resin composition.

10. The display device of claim 1, comprising at least one folding region, wherein the folding region has a radius of curvature that is less than or equal to 5 mm.

11. The display device of claim 1, the display device is a portable electronic device, a personal digital terminal, a tablet, a car navigation unit, a game console, or a wearable device.

* * * * *